(12) United States Patent
Tomm

(10) Patent No.: US 6,246,403 B1
(45) Date of Patent: Jun. 12, 2001

(54) METHOD AND APPARATUS FOR GENERATING A GRAPHICAL USER INTERFACE

(75) Inventor: Douglas Cameron Tomm, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/168,841

(22) Filed: Oct. 8, 1998

(51) Int. Cl.[7] .................................................. G06F 3/00
(52) U.S. Cl. ............................ 345/333; 345/356; 345/967
(58) Field of Search ...................................... 345/326, 333, 345/334, 335, 339, 340, 342, 343, 356, 961, 967; 717/1, 2, 3, 5, 7

(56) References Cited

U.S. PATENT DOCUMENTS

| | | | | |
|---|---|---|---|---|
| 5,347,627 | * | 9/1994 | Hoffman et al. | 345/334 |
| 5,522,024 | * | 5/1996 | Hiraga et al. | 345/333 |
| 5,664,129 | * | 9/1997 | Futatsugi et al. | 345/339 |
| 5,721,848 | * | 2/1998 | Joseph | 345/339 |
| 5,956,029 | * | 9/1999 | Okada et al. | 345/334 |
| 6,014,138 | * | 2/2000 | Cain et al. | 345/335 |
| 6,083,276 | * | 7/2000 | Davidson et al. | 717/1 |

* cited by examiner

Primary Examiner—Crescelle N. dela Torre

(57) ABSTRACT

A method and apparatus is provided for generating a graphical user interface (GUI) from a text file. The apparatus of the present invention comprises a computer configured to run a software program that enables a user to create a text file by using an input device coupled to a console of the computer, such as an editor program, for example. The text file represents a GUI being created. The computer also is configured to run a GUI constructing software program which receives the text file as input and which generates a data tree structure associated with the graphical user interface being created. The data tree structure can then be utilized by a GUI generating software program that receives the data tree structure, generates the GUI, and displays the GUI on a display monitor coupled to the computer. The text file created by the user preferably is a two-dimensional pictorial representation of the GUI and comprises textual characters arranged to form one or more boxes on the display monitor. The GUI constructing program scans the text file and determines the x and y coordinates of the corners of all of the boxes and the data type associated with each box. The GUI constructing program then generates the data tree structure which comprises a node for each box. Once the data tree structure has been created, a GUI generating software program can use the data tree structure to generate the GUI.

20 Claims, 12 Drawing Sheets

```
#ifndef LAYOUT_H
#define LAYOUT_H
#include        "xyString.h"
#include        "Point.h"
typedef struct Box
{
        Point   ne, nw, se, sw;
        xyString        name;
        xyString        Class;
        Box()
        {
        }
        Box(const Box& copyme)
        {
                name = copyme.name;
                Class = copyme.Class;
                ne = copyme.ne;
                nw = copyme.nw;
                sw = copyme.sw;
                se = copyme.se;
        }
        int
        width()
        {
                return ne.x - nw.x;
        }
        int
        height()
        }
                return sw.y - nw.y;
        }
} Box;
typedef struct Node
{
        Box             box;
        Widget          w;
        Node *pred, *succ, *children;
        int mark;
        Node(const Box& b)
        {
                box = b;
                w = (Widget)0;
                mark = 0;;
                pred = succ = children = NULL;
        }
]}Node;
typedef struct DLL
{
        Node *head, *tail;
        DLL()
        {
                head = tail - NULL;
        }
        void
        add(Node *node)
        {
                if (!tail)
                {
                        head = tail = node;
                        return;
                }
                ((Node *)tail)->succ = node;
                        node->pred = tail;
                        tail = node;
        }
}DLL;
void    make_widgets(Widget, Node*);
void create_layout (char *picture[], int nlines,
                        DLL *layout;
*endif
```

FIG 5A

```c
#include    <stdio.h>
#include    <stdlib.h>
#include    <cytpe.h>
#include    <X11/Intrinsic.h>
#include    <Xm/XmAll.h>
#include    "layout.h"
xyString *get_string(char *picture[],
            int& y, int& x);
int encloses(Box *box1, Box *box2);
void find_points(char *picture[], int
            nlines, DLL *northwests,
            DLL *southeasts, xyStrings
            xystrings);
void make_tree(DLL *dll);
void free_node(Node *node)
{
    Node *ptr, *after;
    ptr = node->children;
    while (ptr)
    {
        after = ptr->succ;
        free_node(ptr);
        XtFree((char *)ptr);
        ptr = after;
    }
}
void destroy_dll(DLL *dll)
{
    Node *ptr, *after;
    ptr = dll->head;
    while (ptr)
    {
        after = ptr->succ;
        free_node(ptr);
        free(ptr);
        ptr = after;
    }
}
/*
delete the given node from the given list.
the node is assumed to be a member of the list.
*/
void delete_dll(DLL *dll, Node *node)
{
    if (dll->tail == dll->head)
    {
        delete node;
        dll->tail = dll->head = NULL;
        return;
    }
    if (node == dll->tail)
    {
        dll->tail = dll->tail->pred;
        dll->tail->succ = NULL;
        delete node;
        return;
    }
    if (node == dll->head)
    {
        dll->head = dll->head->succ;
        dll->head->pred = NULL;
        delete node;
        return;
    }
    node->pred->succ = node->succ;
    node->succ->pred = node->pred;
    delete node;
}
Node *enclosure_of(Node *node)
{
    Node *e;
    for (e = node->pred; e; e = e->pred)
    {
        if (encloses(&e->box, &node->
            box))
                return e;
    }
    return NULL;
}
/* translate the box to be relative to the given
    origin */ void translate(Box *box, Point *orig)
{
    box->ne.x -= orig->x;
    box->se.x -= orig->x;
    box->nw.x -= orig->x;
    box->sw.x -= orig->x;
    box->ne.y -= orig->y;
    box->se.y -= orig->y;
    box->nw.y -= orig->y;
    box->sw.y -= orig->y;
}
void set_box(Box *box, Point *nw, Point *ne,
        Point *sw, Point *se)
{
    if (ne)
    {
        box->ne = *ne;
    }
    if (nw)
    {
        box->nw = *nw
    }
```

FIG 5B

```c
        if (se)
        {
                box->se = *se;
        }
        if (sw)
        {
                box ->sw = *sw;
        }
}
/*
returns 1 if the point denoted by x and y
occurs at the northwest corner of a box; 0
otherwise.
*/
int northwest(char *picture[], int nlines, int y,
                int x)
{
        if (y == nlines -1)
                return 0;
        if (x == strlen(picture [y]) - 1)
                return 0;
        if (picture[y] [x] != '+')
                return 0;
        if (picture[y + 1] |[x + 1] != ' '&&
            picture[y + 1][x + 1] != '+')
                return 0;
        if (picture[y] [x + 1] != '-' && picture
            [y] [x + 1] != "+")
                return 0;
        if (picture[y + 1] |[x] != '|' &&
            picture [y + 1] [x] != '+')
                return 0
        return 1;
}
int southeast (char *picture[], int, int y, int x)
{
        if (y == 0)
                return 0;
        if (x == 0)
                return 0;
        if (picture[y][x] != '+')
                return 0;
        if (picture[y - 1] [x - 1] != ' ' &&
            picture [y - 1][x- - 1] != '+')
                return 0;
        if (picture[y][x - 1] != '-' && picture
            [y][x - 1] != '+')
                return 0;
        if (picture[y - 1][x] != '|' && picture
            [y - 1] [x] != '+')
                return 0;
        return 1;
} int northeast (char *picture[], int nlines, int y,
                int x)
{
        if (y == nlines - 1)
                return 0;
        if (x == 0)
                return 0;
        if (picture[y][x] != '+')
                return 0;
        if (picture[y + 1][x - 1] != ' ' && picture
            [y + 1][x - 1] != '+')
                return 0;
        if (picture[y][x - 1] != '-' && picture [y]
            [x - 1] != '+')
                return 0
        if (picture[y + 1][x] != '|' && picture
            [y + 1][x] != '+')
                return 0
        return 1;
}
/*
the point denoted by x and y is taken to be the
northwest corner of some box. If there is a
corresponding northeast corner, save its
coordinate in ne and return 1. if there is no
northeast corner for this x and y, return 0.
*/
int matching_ne(char *picture[], int nlines,
                int y, int x, Point *ne)
{
        if (x == strlen(picture[y]) - 1)
                return 0;
        x++;
        for (; picture[y][x]; x++)
        {
                if (northeast(picture, nlines, y, x))
                {
                        ne->set(x, y);
                        return 1;
                }
        }
        return 0;
}
/*
returns 1 iff box1 encloses box2.
*/
int encloses(Box *box1, Box *box2)
{
```

FIG. 5C

```
    if (box2->nw.x <= box1->nw.x)
         return 0;
    if (box2->nw.y <= box 1->nw.y)
         return 0;
    if box 2->se.x >= box1->se.x)
         return 0;
    if (box2->se.y >= box 1->se.y)
         return 0;
    return 1;
}
/*
assumes that a string lies entirely
within a box if it is in the box at all.
returns true in these cases:
+--------+    +--true--+
| true   |    | -------|

+--------+    +--------+
returns false in these cases:
                         false
+--------+   +--------+  +--------+
false   |    |        |  |        |
+-------+    +-false--+  +--------+
this case is considered to never occur:
+--------+
|  noway
+--------+
*/
int encloses_string(Box *box,
                    xyString *string)
{
    if (box->nw.x >= string->x())
         return 0;
    if (box->ne.x <= string->x())
         return 0;
    if (box->sw.y <= string->y())
         return 0;
    if (box->nw.y > string->y())
         return 0;
    return 1;
}
int southeast_of(Point *nw, Point *se)
{
    if (se->x <= nw->x)
         return 0;
    if (se->y <= nw->y)
         return 0;
    return 1;
}
/* frees the memory associated with
<strings>*/ void resolve_lists (DLL
                    *northwests,
                    DLL
                    southeasts,
                    xyString
                    *strings,
                    DLL *finals)
```

```
{
    Node *nwn, *sen, *nodeptr;
    xyString *stringptr, *nextstring;
    for (nwn = northwests->
           head; nwn; nwn = nwn->succ)
    {
         for (sen = southeasts->head;
                sen; sen = sen->succ)
         {
              Point sw;
              Box box;
              Node *node;
              if (!southeast_of(&nwn
                    ->box.nw, &sen->box.se))
              {
                    continue;
              }
              if (sen->box.se.x != nwn
                    ->box.ne.x)
              {
                    continue;
              }
              sw.set( nwn->box.nw.x,
                    sen->box.se.y);
              set_box(&box,
                    &nwn->box.nw,
                    &nwn->box.ne,
                    &sw, &sen->box.se);
              box.name = nwn->box.name;
              box.Class = nwn->box.Class;
              node = new Node (box);
              finals->add(node);
              break;
         }
    }
    stringptr = strings;
    nextstring = stringptr->next;
    while (stringptr)
    {
         /* walk up through the finals list and
            see who encloses stringptr
         +*/
         nodeptr = finals->tail;
         while (nodeptr && !encloses_
                string(&nodeptr->ptr->box,
                stringptr))
         {
              nodeptr = nodeptr->pred;
         }
         if (!nodeptr)
              break;
```

FIG. 5D

```
            if (!strcmp(*stringptr, "button")
               ||
            if (!strcmp(#stringptr, "frame")
               ||
            if (!strcmp(#stringptr, "field")
               ||
            if (!strcmp(#stringptr, "label")
            )
            {
                    nodleptr->box.Class =
                            *stringptr;
            }
            else
            {
                    nodleptr->box.name =
                            *stringptr;
            }
            delete stringptr;
            stringptr = nextstring;
            nextstring = nextstring->next;
        }
}
void create_layout(char *picture[], int nlines,
                    DLL *layout)
{
        xyString *strings = NULL;
        DLL northwests, southeasts;
        find_points(picture, nlines,
                    &northwests, &southeasts,
                    &strings);
        /* oh goody. now we have two lists of
        incomplete boxes. the first has boxes
        with the northwest and northeast points
        filled in. the other has boxes with the
        southeast points filled in. now we find
        which matches whiich. */
        resolve_lists(&northwests, &southeasts,
                strings, layout);
        /* the 'layout' list mow contains the
        rects that make up the layout. They are
        sorted by increasing y, then by
        increasing x. that is, for a given box B
        in the list, the NE point of B is NE of
        every box in the list that comes after B.
        */
        /* now we figure out what encloses
            what. */
        make_tree(layout);
        destroy_dll(&northwests);
        destroy_dll(&southeasts);
}
/*
sweep over the array from left to right and from
top to bottom.
make a list of all points that look like northwest
points;
``` make another list of all points that look like
southeast.by the sweeping method we use,
the lists will be sorted by increasing y, then
by increasing x. for each northwest point that
we find, the corresponding northeast point is
easy to spot; record these together. after we're
done sweeping, go through the list of NW/NE
points; for each, find the SE point that
combines with the NW point to produce
the NE point. (there might not be one, which
means that the NW point was a phony.
*/
void find_points(char *picture[], int nlines, DLL
                *northwests, DLL *southeasts,
                xyString **xystrings)
{
        int i;
        xyString *head = NULL;
        for (i = 0; i < nlines; i++)
        {
                int j;
                for (j = 0; picture[i][j]; j++)
                {
                        Node *node;
                        Box box;
                        // found a string
                        if (isalpha(picture[1][j]))
                        {
                                xyString *str =
                                    get_string
                                    (picture, i, j);
                                str->next = head;
                                head = str;
                                /* fall through,
                                don't
                                continue */
                        }
                        if (picture[i][j] != '+'
                        {
                                continue;
                        }
                        if (northwest(picture,
                            nlines, i, j))
                        {
                        Point ne;
                        if (matching_ne(picture,
                            nlines, i, j, &ne))
                        {

*FIG. 5E*

```
                                    Point nw;                box's child list and delete me from the finals list.
                                    nw.set(j, i);            when we're done, the finals list will contain the
                                    set_box(&box,            roots of all the widget trees.
                                           &nw               */
                                           &ne,              void make_tree(DLL *dll)
                                           (Point *)         {
                                           0, (Point            Node *tail = dll->tail;
                                           + *)0;              Node *sacrum = NULL;
                                                               Node *en = NULL;
    + &se);                         node = new                if (tail)
                                           Node              {
                                           (box);               sacrum = tail->pred;
                                    southeasts->           }
                                    add(node);             while (tail != dll->head)
                                                           {
                               }                              if (en = enclosure_of(tail)
                          }                                   {
                     }
                *xystrings = head;                                /* copy tail and make it a
            }                                                        child of the enclosure.
            /*                                                       translate its coordinate
            *precondition: isalnum(picture[*x] [*y]) is              to be relative to the
              true                                                   parent */
            *
            *postcondition: on exit from this, x and y give           Node *n=new Node(tail-
                             the coordinates of the                   > box);
                             character that immediately               n->children=tail->children;
                             follows the string.                      n->succ = en->children;
            */                                                        en->children = n;
            xyString *get_string(char *picture[], int& y,             translate(&n->box, &en->
                                 int& x)                                   box.nw);
            {                                                         delete_dll(dll, tail);
                 char *start, *ptr;                                }
                 xyString *rval;                                   tail = sacrum;
                 int length;                                       if (tail)
                 start = &picture[y][x];                           {
                 for (ptr = start; isalnum(*ptr); ptr++,              sacrum = sacrum->pred;
                      x++)                                         }
                 {                                             }
                     ;                                     }
                 }                                         /* the layout should describe one tree; the picture
                 /* start and ptr now delimit the ends of  should have only one top-level box.
                    the string */                          every widget specified in the screen file is created
                 length = (int)(ptr - start);              as the child of a frame widget. This is not the
                 char *tbuf = new char(length + 1);        case, however, if the specified widget is already
                 memcpy(tbuf, start,, length);             a frame widget.
                 tbuf[length] = '\0';                      */
                 rval = new xyString(tbuf);               void make_widgets(Widget parent, Node *node)
                 rval->x(x);                              {
                 rval->y(y);
                 delete tbuf;
                 return rval;
            }
            /*
            walk back through the list and find the box that
            encloses me. thanks to they way the list is                    FIG. 5F
            sorted, the first enclosing box we encounter is
            the innermost enclosing box. put me into that
```

FIG. 5F

```
Node        *kids;
Widget      widget;
int         w = node->box.width();
int         h = node->box.height();
const char  *wname = NULL;
WidgetClass wc;
Arg         args[10];
int         n = 0;

/*
if this node has kids
        node->w = framed form widget
        manage the form
else
        node->w = button
for all kids
        make_widgets(form, kid)
        set postion of kid
manage node->w
*/

/* naming the widgets:
    if the box has no name or class, punt.
    if the box has a name
          wname = name
    else
          wname = class name
*/
if (!node->box.name &&
    !node->box.Class)
{
        return;
}
//
// y'know, you wouldn't have to tell a
    *good* compiler to do this case...
//
if ((int)node->box.name)
{
        wname = node->box.name;
}
else
{
        wname = node->box.Class;
}
/* figure out the widget Class */
if (node->children)
{
        wc = xmFormWidgetClass;
        n = 0
        XtSetArg(args[n], XmNfraction
              Base, 100);
                              n++;
}
else if ((int)node->box.Class)
{
        if (!strcmp(node->box.Class,
            "label"))
        {
                wc = xmLabelWidget
                     Class;
        else if (!strcmp(node->box.
                 Class, "frame"))
        {
                wc = xmFrameWidget
                     Class;
        }
        else if (!strcmp(node->box.
                 "field"))
        {
                wc = xmFrameWidget
                     Class;
        }
        else
        {
                wc = xmPushButton
                     WidgetClass;
        }
}
else
{
        wc = xmPushButtonWidget
             Class;
}
if (wc == xmFrameWidgetClass)
{
        node->w = XtCreateManaged
                  Widget(wname,
                         wc,
                         parent,
                         args, n);
        return;
}
node->w = XtVaCreate Managed
          Widget ("frame",
                  xmFrameWidgetClass,
                  parent,
                  NULL);

widget = XtVaCreateManagedWidget
         (frame",
          xmFrameWidgetClass,
          parent,
          NULL);
widget = XtCreateManagedWidget
         (wname,
          wc,
          node->w,
          args, n);
for (kids = node->children; kids; kids =
     kids
     ->succ)
```

*FIG. 5G*

```
}
make_widgets(widget, kids);
XtVaSetValues(kids->w,
        XmNtopAttachment,
XmATTACH_POSITION,
        XmNbottomAttachment,
XmATTACH_POSITION,
        XmNleftAttachment,
XmATTACH_POSITION,
        XmNrightAttachment,
XmATTACH_POSITION,
        XmNtopPosition, kids->
          box.nw.y * 100 / h,
        XmNbottomPosition,
kids->
          box.sw.y * 100 / h,
        XmNleftPosition, kids-
>box.
          nw.x * 100 / w,
        XmNrightPosition, kids-
>
          box.ne.x * 100 / w,
        NULL);
```

*FIG. 5H*

METHOD AND APPARATUS FOR GENERATING A GRAPHICAL USER INTERFACE

TECHNICAL FIELD OF THE INVENTION

The present invention relates to a method and apparatus for generating a graphical user interface and, more particularly, to a method and apparatus which converts a text file into a data tree structure which can be used to generate a graphical user interface.

BACKGROUND OF THE INVENTION

A typical approach for creating a graphical user interface (GUI) is to write a software program which is designed to operate in conjunction with a tool kit to cause routines of the windowing system to generate a GUI. For example, the X Window System™ provides a library known as Xt that contains data types called "widgets," with which application programmers may implement a GUI in the C programming language. Another such tool kit is Motif, which was created by the Open Group.

One of the disadvantages of creating GUIs in this manner is that intensive programming is often required in order to write the software program which interfaces with the tool kit to create the GUI. Also, since these types of tool kits are adapted to be implemented with a particular windowing system (e.g., the X Window™ System), the software program written to work with the tool kit is normally limited to use with the particular windowing system.

Another disadvantage of utilizing a tool kit to create GUIs is that a GUI created in this manner cannot be easily modified. In order to modify the GUI, the software program must be modified or rewritten, which can be a very tedious and time consuming process. Furthermore, this cannot be easily done by anyone other than persons trained or experienced in writing or modifying the particular type of software program. Therefore, if the user of the GUI wants to modify the GUI, doing so will be a difficult task.

Drawing programs are currently available on the market which enable a person to create a GUI by drawing the desired GUI, rather than writing code to create the GUI. One disadvantage of using a drawing program to create a GUI is that a GUI created with a drawing program is difficult to modify. Once the GUI has been created, the drawing program normally cannot be used to modify the GUI. Rather, the GUI file created with the drawing program must be modified in order to modify to GUI. Since the GUI file created with the drawing program normally is not in a form that is easily readable by humans, modifying a GUI created in this manner can be an extremely arduous task. Another disadvantage of using these types of drawing programs to create GUIs is that they are usually designed to be implemented with a particular windowing system and are not adapted to be used with multiple types of windowing systems.

Accordingly, a need exists for a method and apparatus that can be used for creating a GUI which are suitable for use with different types of windowing systems and which enable a GUI to be easily created and/or modified by a user without having to write code.

SUMMARY OF THE INVENTION

The present invention provides a method and apparatus for generating a graphical user interface from a text file. The apparatus of the present invention comprises a computer configured to run a software program that enables a user to create a text file by using an input device coupled to a console of the computer. The text file represents a graphical user interface being created. The computer also is configured to run a graphical user interface constructing software program which receives the text file as input and which generates a data tree structure associated with the graphical user interface being created.

Preferably, the computer is also configured to run a graphical user interface generating software program that receives the data tree structure, generates the graphical user interface, and displays the graphical user interface on a display monitor coupled to the computer. The text file created by the user preferably is a two-dimensional pictorial representation of the graphical user interface comprising textual characters arranged to form one or more boxes on the display monitor. Each box has four corners and each corner of the box has an x and a y coordinate associated with it. Each box has a data type associated with it.

The graphical user interface constructing program scans the text file and determines the x and y coordinates of the corners of all of the boxes and the data type associated with each box. The graphical user interface constructing program then generates the data tree structure which comprises a node for each box. Each node identifies the coordinates of the box with which it is associated and the data type corresponding to the box with which it is associated.

The data tree structure includes information identifying ancestral relationships among the boxes of the text file. The ancestral relationship information indicates which box is a parent of another box and which box is a child of another box. A first box is a parent of a second box if the first box encloses the second box in the two-dimensional representation. In this case, the second box is a child of the first box. Each box represents a window in the graphical user interface. Preferably, a data type associated with a box is identified by textual characters arranged on the top edge of the box with which the data type is associated. Each box preferably has a name associated with it and which is identified by textual characters arranged within the box with which the name is associated. The name is displayed in the window corresponding to the box when the graphical user interface is displayed on the display monitor.

Once the data tree structure has been created, the graphical user interface generating software program uses the data tree structure to generate the graphical user interface and displays the graphical user interface on a display monitor coupled to the computer.

In accordance with the method of the present invention, a text file representing a graphical user interface is created using a software program such as an editor program or a word processing program. The graphical user interface constructing program then generates the data tree structure from the text program. The graphical user interface generating program then transforms the data tree structure into the graphical user interface. Therefore, the user can create a graphical user interface by simply creating a text file that represents the graphical user interface. The computer then creates the graphical user interface and displays it on the display monitor.

These and other features and advantages of the present invention will become apparent from the following description drawings and claims.

BRIEF DESCRIPTION OF THE DRAWINGS

FIGS. 5A–5H illustrate an exemplary embodiment of actual code of a GUI constructing program written in the C++ programming language in accordance with the present invention.

DETAILED DESCRIPTION OF THE INVENTION

The present invention provides a method and apparatus for automatically creating a GUI from a text file. In accordance with the present invention, a user may create and maintain GUIs without having to do any computer programming. The user simply uses a line or text editor to generate a text file which represents a GUI. A GUI constructing program then transforms the text file into a data tree structure which can be used by an off-the-shelf application program interface (API) to create a GUI. Preferably, the GUI constructing program is source code capable of being compiled and executed on different types of computer systems. For example, the GUI constructing program may be written in the C or C++ programming languages since most compilers are capable of compiling programs written in these languages. Since source code can be written which is capable of being compiled and run on a variety of different types of computer systems, the present invention is not limited to use with any particular type of computer system.

It should also be noted that the GUI constructing program of the present invention is suitable for use with different types of windowing systems, such as, for example, Microsoft Windows™, the X Window System™, or the Java™ AWT tool kit, and is not limited to use with any particular type of windowing system, i.e., it is platform-independent.

Figure 1:
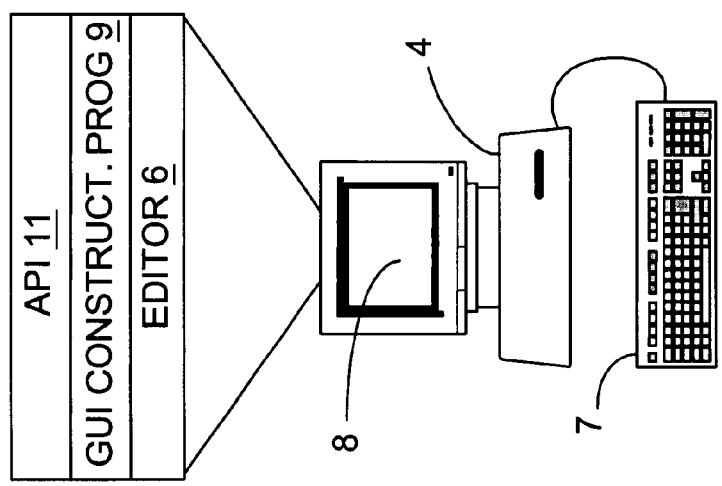
FIG. 1 is a pictorial representation of a computer used in accordance with the present invention by a user to create a text file.

FIG. 1 is a pictorial representation of a computer 4 used in accordance with the present invention by a user to create a text file. A user (not shown) enters text via a keyboard 7 or some other input device coupled to the console of a computer 4 running a suitable windowing system. An editor program 6 running on computer 4 receives the data entered at the computer console and displays the text file on a monitor 8 coupled to the computer 4. The text file displayed on the monitor 8 describes the desired GUI. The text file contains no programming statements or constructs. The text file is simply a picture of the GUI that the user wishes to create. Once the text file has been created, a GUI constructing program 9 generates a data tree structure from the text file which is used by an application program interface (API) 11 to generate a GUI to be displayed on display monitor 8.

The editor program 6 can be any editor program suitable for creating and/or modifying text. A word processor program may also be used for this purpose, as will be understood by those skilled in the art. Several off-the-shelf and proprietary programs exist which are suitable for this purpose. Once the text file has been created, the text file is stored in a memory device (not shown) which may be comprised by computer 4. Alternatively, the memory device may be external to and in communication with computer 4.

Figure 2A:
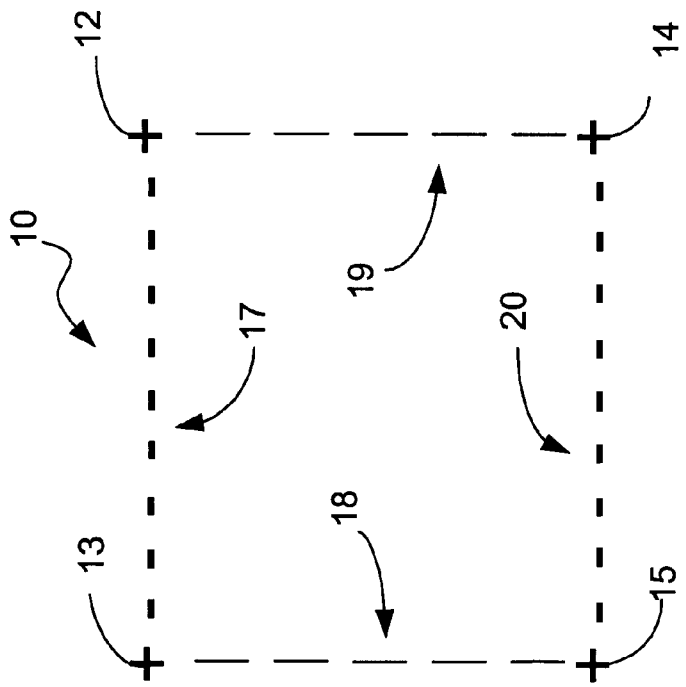
FIG. 2A demonstrates a text file describing a window of a GUI being designed in accordance with the present invention.

FIG. 2A demonstrates a text file describing a window of a GUI being designed in accordance with the present invention. The user delimits the boundaries of the window by drawing a box 10 with textual characters. It will be understood by those skilled in the art that the textual characters used are not limited to any particular characters. For exemplary purposes, it will be assumed that the textual characters used to create the window are ASCII characters and are plus signs, hyphens and vertical bars.

In accordance with the preferred embodiment of the present invention, all components of the GUI associated with a particular window, such as labels and push buttons, for example, appear inside or on an edge of the box representing the window. However, it will be understood by those skilled in the art that a different convention can be used for associating these components with the box as long as the GUI constructing program is designed in accordance with the selected convention.

As shown in FIG. 2A, a box 10 is a rectangle in a coordinate plane and is defined by four vertices 12, 13, 14 and 15. The present invention is not limited with respect to the aspect ratios of the boxes. Orthogonal sides of a box can have the same or different dimensions, as will be understood by those skilled in the art. Each vertex 12, 13, 14 and 15 has an x and a y coordinate associated with it. The vertices 12, 13, 14 and 15 will be referred to herein as the northeast, northwest, southeast, and southwest vertices, respectively. These points delimit the four sides of a box 10. It should be noted that these directional indications are used for convenience of reference and to assist the user in writing the GUI constructing program. Other directional indications can be used instead, such as, for example, top left, bottom right, etc.

A box 10 has four edges 17, 18, 19 and 20. The top edge 17 connects the northwest vertex 13 and the northeast vertex 12. The left edge 18 connects the northwest vertex 13 and the southwest vertex 15. The right edge 19 connects the northeast vertex 12 and the southeast vertex 14. The bottom edge 20 connects the southwest vertex 15 and the southeast vertex 14.

A box 10 encloses a point P (not shown) if it lies in the interior of the box 10. For purposes of describing a particular implementation of the present invention, it will be assumed herein that if a point lies on the top or right edges 17 and 19 of the box 10, the box 10 encloses the point. These or similar rules must be followed in order to enable windows components to be associated with their respective boxes, as will be understood by those skilled in the art.

Preferably, each box also has a name and a data type associated with it, which are text strings that are used by the windowing system executing the GUI constructing program to create windows and other GUI components. The name is simply a word or a combination of words that will be displayed in the GUI window associated with the box. The data type informs the GUI constructing program of the manner in which the box must be handled by the GUI constructing program. It will be understood by those skilled in the art that the data type can be a type unique to the GUI constructing program ( i.e., a data type created by the programmer) or it can be a data type provided as a widget of a windowing system tool kit, such as Motif, for example.

Figure 2B:
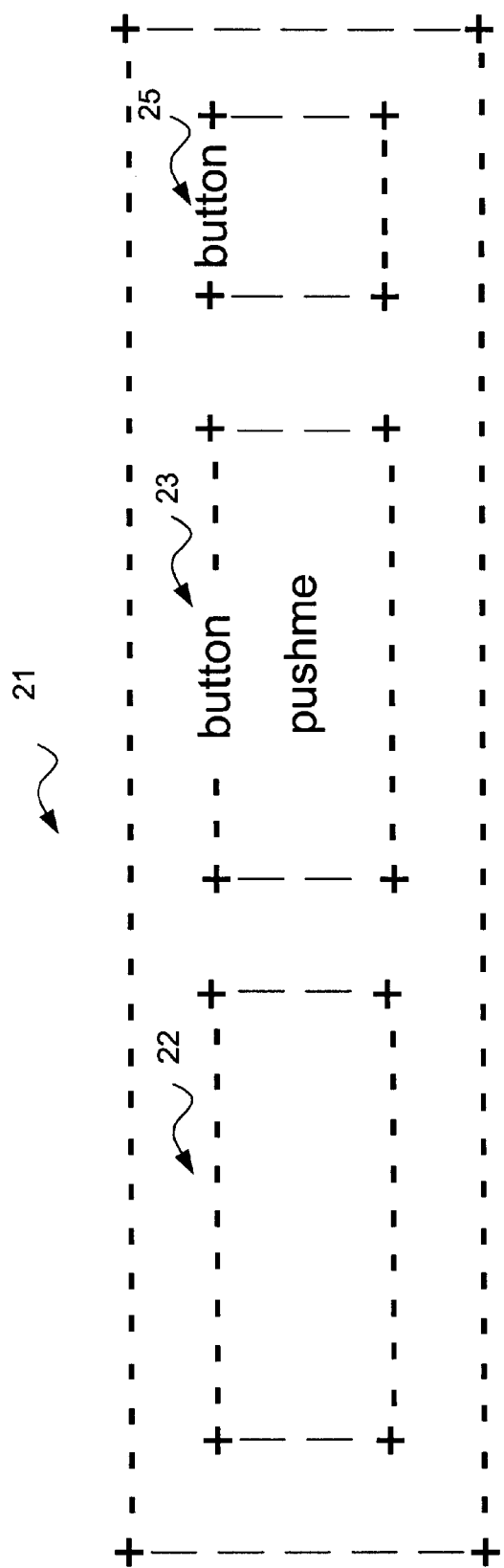
FIG. 2B illustrates a box containing three boxes, each of which is associated with its own window in a GUI being created in accordance with the present invention.

FIG. 2B illustrates a box 21 containing three boxes 22, 23 and 25. Each of the boxes 21, 22, 23 and 25 is associated with its own window in the GUI being created. The box 22 simply represents an empty window. Box 22 is illustrated to demonstrate that a box does not have to have a name and data type associated with it. The boxes 23 and 25 are dialog boxes containing GUI components commonly referred to as push buttons. The indication "button" on the top edges of the boxes 23 and 25 corresponds to the data type of the boxes and indicates to the GUI constructing program that the box data type is push button. The name "pushme" in box 23 indicates to the user of the GUI an action which may be taken by the user to cause the GUI to perform some task, i.e., to cause a particular event to occur. Both the data type and name are optional. Both can be provided with default names and data types by the GUI constructing program.

Figure 3:
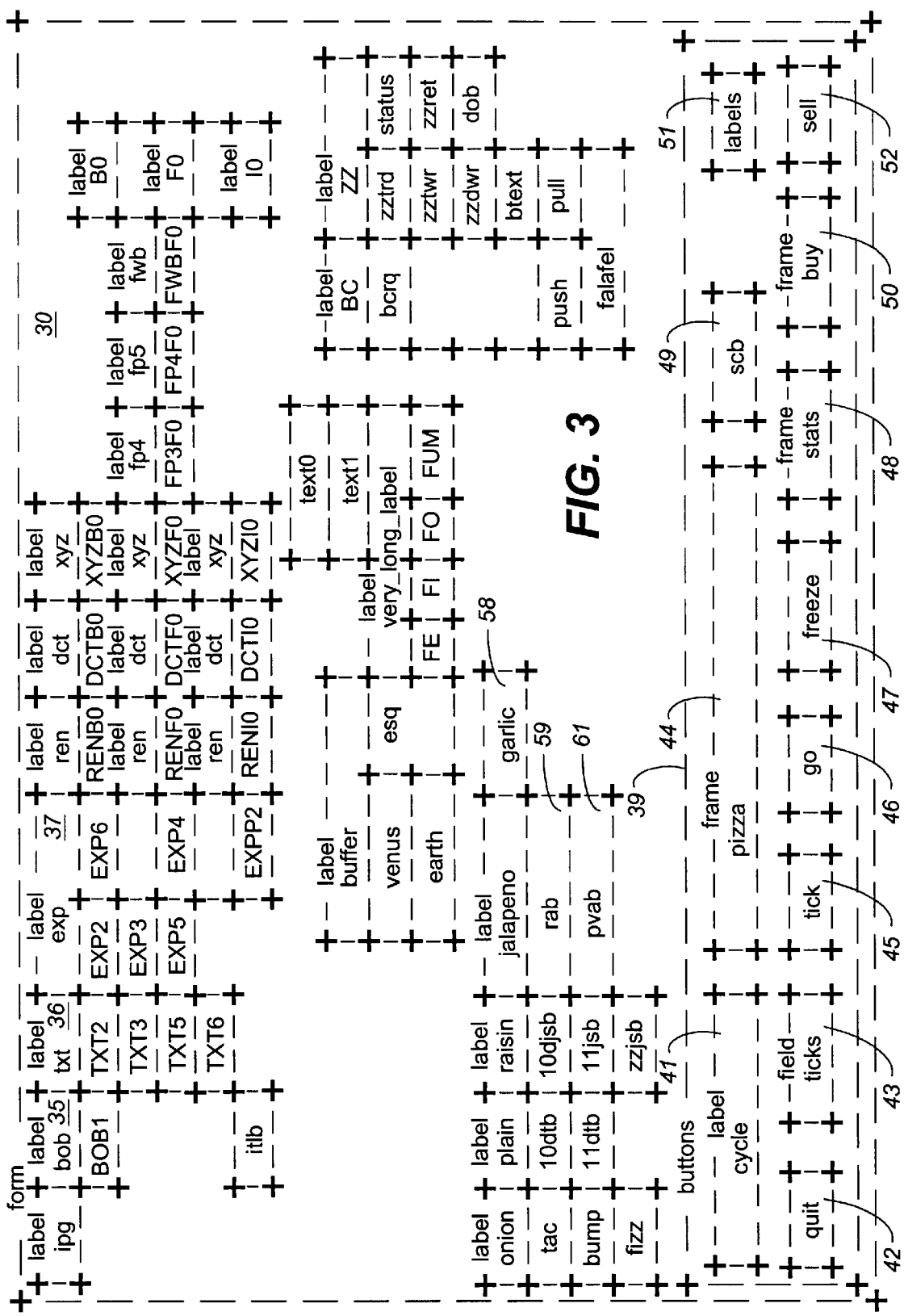
FIG. 3 illustrates a text file for an entire GUI being created in accordance with the present invention.

FIG. 3 illustrates a text file 30 for an entire GUI being created in accordance with the present invention. The data types of the boxes are placed on the top edges of the boxes and the names associated with the boxes are placed within the boxes. For example, boxes which are of the data type "label" have the word "label" typed on the top edges of the boxes. For example, boxes 35, 36 and 37 display the labels "bob", "text" and "exp" in the windows associated therewith. This data type does not generate an event when selected by the user of the GUI.

The box 39 containing the word "buttons" on its top edge indicates that the boxes 41–52 contained within box 39 are of the data type "button". This feature of the present invention enables each of the buttons within the box 39 to have a data type contained on the top edge thereof which further defines the button. For example, box 44 has the data type "frame" on its top edge, which indicates to the GUI constructing program that this button is to have a frame disposed about it. A default data type may also by provided in the GUI constructing program for boxes which do not have a data type specified on the top edges thereof.

In the example illustrated in FIG. 3, all of the boxes which do not display a specific data type on the top edges thereof are assigned the button data type. For example, boxes 58, 59 and 61 do not display a specific data type and, therefore, are assigned the button data type. The names associated with the boxes are typed inside of the boxes so that the windows associated with them will display the names and thereby provide the user of the GUI with information relating to the button. The data type "frame" specified on the top edge of box 44 is a data type provided by the Motif tool kit. Therefore, in accordance with the present invention, the GUI constructing program can be designed to handle data types created by the user and/or data types provided in a typical windowing system tool kit. The GUI data types include, for example, buttons, labels, menus, lists, frames, fields, etc.

The data types that are placed on the top edges of the boxes identify the data type of the corresponding GUI component to the underlying windowing system and to the GUI constructing program. This is an important bonding mechanism between the data structures generated by the GUI constructing program and the software routines, commonly referred to as call-back routines, which are events that occur when a GUI component, such as a button, for example, is activated. The call-back routines use these labels to manipulate the GUI components, as will be understood by those skilled in the art. For example, if the programmer wishes to define actions to be taken when the "Cancel" button is clicked, the programmer would first request that the windowing system provide the handle for the button named "PB_Cancel". The programmer would then use this handle when writing a call-back routine associated with the button.

Once the user has created the text file specifying the GUI to be generated, the text file is used as the input to the GUI constructing program. The GUI constructing program converts the input text file into a data tree structure that completely specifies the GUI. This data tree structure contains the relative dimensions and locations of the boxes that appear in the input text file, the names and types of the boxes, and the enclosure relationships among the boxes.

Figure 4:
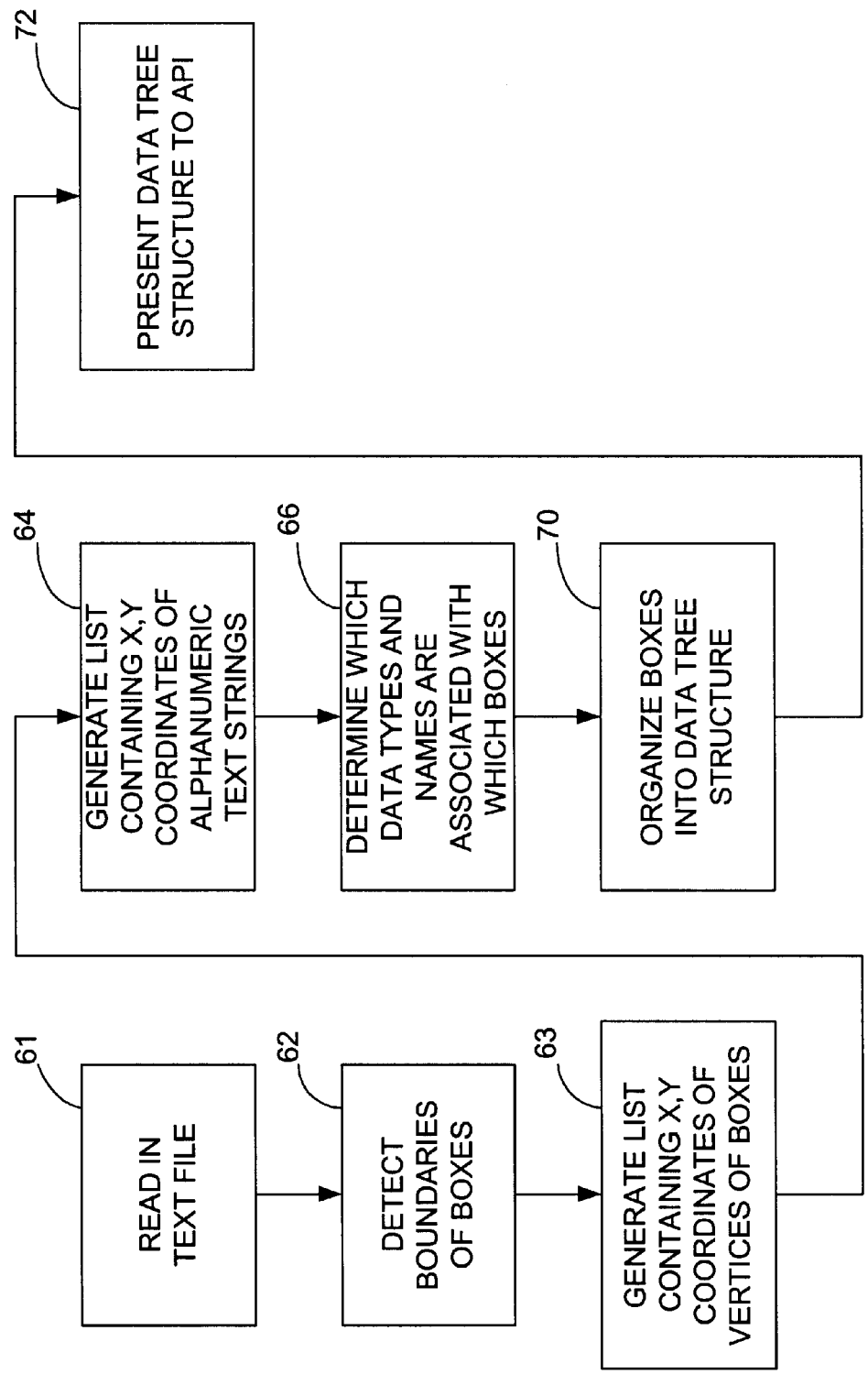
FIG. 4 is a flow chart functionally illustrating the GUI constructing program of the present invention for constructing the data tree structure of the present invention.

FIG. 4 is a flow chart functionally illustrating the GUI constructing program of the present invention for constructing the data tree structure of the present invention. FIGS. 5A–5H illustrate an exemplary embodiment of the actual source code of a GUI constructing program written in the C++ programming language in accordance with the present invention. FIGS. 5A and 5B contain the source code defining the data structure types to be used by the GUI constructing program. FIGS. 5C–5H contain the source code for reading in the text file and for generating the data tree structure from the text file. It will be understood by those skilled in the art that the GUI constructing program illustrated in FIGS. 5A–5H is an example of an actual implementation of a GUI constructing program designed in accordance with the present invention and that the present invention is not limited to this particular implementation.

Since persons skilled in the art will understand how a suitable GUI constructing program, such as that shown in FIGS. 5A–5H, can be designed, a detailed discussion of the source code shown in FIGS. 5A–5H will not be provided herein. Rather, a discussion of the functionality that must be provided by the GUI constructing program will be discussed with respect to the flow chart of FIG. 4.

As shown in FIG. 4, the first step in the process of generating a GUI from a text file is to read the text file from memory, as indicated by block 61. As the text file is read out of memory, the GUI constructing program detects the boundaries for each of the boxes, as indicated by block 62. This step involves determining the x and y coordinates of the vertices, which are points at which at least two orthogonal lines meet. It will be understood by those skilled in the art that different algorithms can be designed which are suitable for performing this task which may perform this task differently. Therefore, the present invention is not limited to any particular algorithm for performing this task.

As the vertices of the boxes are detected, the x and y coordinates of the vertices of each box are stored in a list or lists in a memory device, as indicated by block 63. The memory device may be either inside of, or external to, the computer 4. In accordance with the preferred embodiment of the present invention, two lists are used for storing the coordinates of the vertices of the boxes. One of the lists contains only the northeast and northwest vertices of the boxes and the other list contains only the southeast vertices of the boxes. Two lists are preferably used because of the difficulty associated with determining all of the vertices of the boxes in a single pass when scanning the text file.

Once both of the lists have been generated, a determination is made as to which southeast vertices are associated with which northeast and northwest vertices. The southeast vertex which has the same y coordinate as the northeast vertex and which is closest to the x coordinate of the northeast and northwest vertices belongs to the box associated with the northeast and northwest vertices. The southwest vertex is then determined by calculating the coordinates of a point having the x coordinate of the southeast point and the y coordinate of the northwest point. A single list containing all of the vertices of all of the boxes is then generated from these two lists.

The x and y coordinates of the text strings corresponding to the data types and names contained in the input text file are also stored in a list in the memory device, as indicated by block 64. Once the vertices for a particular box have been determined, the x and y coordinates of the vertices of the box are used by the GUI constructing program to determine whether the box has any data types or names associated with it, as indicated by block 66. If the text string is on the top edge of the box, it will be treated as a data type by the GUI constructing program. If the text string is within the box, it will be treated as a name by the GUI constructing program. Once the list of boxes has been generated, the collection of boxes is organized into a data tree structure, as indicated by block 70. The data tree structure is then used by an API to generate the GUI, as indicated by block 72.

The data tree structure is organized based on the spatial relationship of the boxes on the display monitor 8, i.e., based on the x and y coordinates of the box vertices. In accordance with the preferred embodiment, the GUI constructing program uses the x and y coordinates of the vertices of the boxes to determine which boxes are enclosed by other boxes. Each box represents a node in the data tree structure. The parent of a node is the innermost box that encloses another box. In other words, there are no boxes enclosing the child box that are also enclosed by the parent box. A box enclosed by the child box is a child of the child box and a grandchild of the parent box.

Each node of the data tree structure contains all of the objects associated with the box that corresponds to the node, such as the x and y coordinates associated with the box, the data types associated with the box and the name associated with the box, if any, and the enclosure relationships among the boxes. Therefore, the data tree structure contains all of the parent/child relationships for all of the objects that will be contained in the GUI. The parent/child relationships of the data tree structure of the present invention model the parent/child relationships normally occurring among typical GUI components. A tool kit, such as Motif, can be used to write an API that is designed to receive as input this type of data tree structure and to create a GUI from the data tree structure. Persons skilled in the art will understand how such an API could be designed for this purpose.

In order to modify a GUI created from the data tree structure of the present invention, the text file is simply read out of memory and modified using the editor 6. The GUI constructing program then generates a new data tree structure based on the modified input text file. The new data tree structure is then manipulated by the API to generate the GUI.

It will be understood by those skilled in the art that the present invention has been discussed with respect to the preferred embodiments but that the present invention is not limited to these embodiments. It should also be noted that modifications may be made to the embodiments discussed above without deviating from the spirit and scope of the present invention, as will be understood by those skilled in the art.

What is claimed is:

1. An apparatus for generating a graphical user interface to be displayed on a display monitor, the apparatus comprising:

a computer configured to run an editor software program that enables a user to create and view on a display monitor a text file, the user creating, the text file by manipulating an input device in communication with the computer, the text file displayed on the display monitor being a two-dimensional visual representation of a graphical user interface being created, the computer being configured to run a graphical user interface constructing software program which receives the text file as input and which generates a data tree structure associated with the graphical user interface being created, the data tree structure being suitable for processing by a graphical user interface generating software program to generate a graphical user interface and to cause the graphical user interface to be displayed on a display monitor.

2. The apparatus of claim 1, wherein the computer is configured to run the graphical user interface generating software program, to generate the graphical user interface from the data tree structure and to cause the graphical user interface to be displayed on a display monitor.

3. The apparatus of claim 2, wherein the text file created by the user is a two-dimensional pictorial representation of the graphical user interface, the two-dimensional representation comprising textual characters arranged to form at least one box on the display monitor, the box having four corners, each corner of the box having an x and a y coordinate associated therewith, the box having a data type associated therewith, wherein the graphical user interface constructing program scans the text file to determine the x and y coordinates of the corners of all of the boxes and to determine the data type associated with each box and generates the data tree structure, the data tree structure comprising a node for each box, each node identifying the coordinates of the box with which it is associated and the data type corresponding to the box with which it is associated.

4. The apparatus of claim 3, wherein the data tree structure includes information identifying ancestral relationships among boxes of the two-dimensional representation, the ancestral relationship information indicating which box is a parent of another box and which box is a child of another box, wherein a first box is a parent of a second box if the first box encloses the second box in the two-dimensional representation and wherein the second box is a child of the first box.

5. The apparatus of claim 4, wherein a data type associated with a box is identified by textual characters identifying the data type arranged on the top edge of the box with which the data type is associated.

6. The apparatus of claim 5, wherein each box represents a window in the graphical user interface.

7. The apparatus of claim 6, wherein each box has a name associated with it and wherein the name is identified by textual characters identifying the name arranged within the box with which the name is associated, wherein the name is displayed in the window corresponding to the box when the graphical user interface is displayed on the display monitor.

8. An apparatus for generating a graphical user interface to be displayed on a display monitor, the apparatus comprising:

first means for allowing a user to create a text file and to cause the text file to be displayed on a display monitor; and second means for creating a graphical user interface from the text file, the text file being a two-dimensional representation of the graphical user interface, said second means receiving the text file as input and generating a data tree structure associated with the graphical user interface being created, the data tree structure being suitable for processing by a graphical user interface generating software program to generate a graphical user interface and to cause the graphical user interface to be displayed on a display monitor.

9. The apparatus of claim 8, further comprising third means, the third means receiving the data tree structure and generating the graphical user interface from the tree structure, the third means causing the graphical user interface to be displayed on a display monitor coupled to said apparatus.

10. The apparatus of claim 9, wherein the text file is a two-dimensional pictorial representation of the graphical user interface, the two-dimensional representation comprising textual characters arranged to form at least one box on the display monitor, the box having four corners, each corner of the box having an x and a y coordinate associated therewith, the box having a data type associated therewith, wherein said means scans the text file and determines the x and y coordinates of the corners of all of the boxes, determines the data type associated with each box, and generates the data tree structure, the data tree structure comprising a node for each box, each node identifying the coordinates of the box with which it is associated and the data type corresponding to the box with which it is associated.

11. The apparatus of claim 10, wherein the data tree structure includes information identifying ancestral relationships among boxes of the two-dimensional representation, the ancestral relationship information indicating which box is a parent of another box and which box is a child of another box, wherein a first box is a parent of a second box if the first box encloses the second box in the two-dimensional representation and wherein the second box is a child of the first box.

12. The apparatus of claim 11, wherein a data type associated with a box is identified in the two-dimensional representation by textual characters identifying the data type arranged on the top edge of the box with which the data type is associated.

13. The apparatus of claim 12, wherein each box represents a window in the graphical user interface.

14. The apparatus of claim 13, wherein each box has a name associated with it and wherein the name is identified by textual characters representing the name arranged within the box with which the name is associated, wherein the name is displayed in the window associated with the box when the graphical user interface is displayed on the display monitor.

15. A method for generating a graphical user interface to be displayed on a display monitor, the method comprising the steps of:

creating text file representing a graphical user interface to be created, the text file being a two-dimensional representation of the graphical user interface being created; and generating a data tree structure associated with the graphical user interface being created from the text file, the data tree structure being suitable for processing by a graphical user interface program to generate the graphical user interface and to cause the graphical user interface to be displayed on a display monitor.

16. The method of claim 15, further comprising the steps of:

processing the data tree structure by said graphical user interface program to generate the graphical user interface and causing the graphical user interface to be displayed on a display monitor.

17. The method of claim 16, wherein the text file is a two-dimensional pictorial representation of the graphical user interface, the two-dimensional representation comprising textual characters arranged to form at least one box on the display monitor, the box having four corners, each corner of the box having an x and a y coordinate associated therewith, the box having a data type associated therewith, wherein the creating step included scanning the text file to determine the x and y coordinates of the corners of all of the boxes and to determine the data type associated with each box, wherein the data tree structure comprises a node for each box, each node identifying the coordinates of the box with which it is associated and the data type corresponding to the box to which it is associated.

18. The method of claim 17, wherein the data tree structure includes information identifying ancestral relationships among boxes of the two-dimensional representation, the ancestral relationship information indicating which box is a parent of another box and which box is a child of another box, wherein a first box is a parent of a second box if the first box encloses the second box in the two-dimensional representation and wherein the second box is a child of the first box.

19. A computer-readable medium having a computer program thereon, the computer program comprising:

code for converting a text file corresponding to a two-dimensional pictorial representation of a graphical user interface into a data tree structure associated with the graphical user interface being created, the data tree structure being suitable for processing by a graphical user interface generating software program to generate a graphical user interface and to cause the graphical user interface to be displayed on a display monitor.

20. The computer-readable medium of claim 19, wherein the text file comprises textual characters arranged to form at least one box on the display monitor, the box having four corners, each corner of the box having an x and a y coordinate associated therewith, the box having a data type associated therewith, said code including instructions for scanning the text file to determine the x and y coordinates of the corners of all of the boxes and for determining the data type associated with each box, the code including instructions for generating the data tree structure using the x and y coordinates and the data type associated with each box.

* * * * *

UNITED STATES PATENT AND TRADEMARK OFFICE
CERTIFICATE OF CORRECTION

PATENT NO. : 6,246,403 B1
DATED : June 12, 2001
INVENTOR(S) : Tomm

It is certified that error appears in the above-identified patent and that said Letters Patent is hereby corrected as shown below:

Column 7,
Line 62, after "creating" delete ","

Column 8,
Line 11, after "program" delete ","

Signed and Sealed this

Thirteenth Day of April, 2004

JON W. DUDAS
*Acting Director of the United States Patent and Trademark Office*